US010223152B2

United States Patent
Cao et al.

(10) Patent No.: US 10,223,152 B2
(45) Date of Patent: Mar. 5, 2019

(54) OPTIMIZED MIGRATION OF VIRTUAL OBJECTS ACROSS ENVIRONMENTS IN A CLOUD COMPUTING ENVIRONMENT

(71) Applicant: International Business Machines Corporation, Armonk, NY (US)

(72) Inventors: Bin Cao, Rochester, MN (US); Daniel L. Hiebert, Pine Island, MN (US); Brian R. Muras, Rochester, MN (US); Tanveer Zubair, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/815,489

(22) Filed: Nov. 16, 2017

(65) Prior Publication Data

US 2018/0074844 A1   Mar. 15, 2018

Related U.S. Application Data

(63) Continuation of application No. 14/584,760, filed on Dec. 29, 2014, now Pat. No. 9,870,244.

(51) Int. Cl.
*G06F 9/455* (2018.01)
*H04L 12/46* (2006.01)
(Continued)

(52) U.S. Cl.
CPC .......... *G06F 9/45558* (2013.01); *G06F 9/50* (2013.01); *H04L 12/4641* (2013.01); *H04L 41/0813* (2013.01); *H04L 41/0826* (2013.01); *H04L 41/0896* (2013.01); *H04L 41/12* (2013.01); *H04L 67/10* (2013.01); *H04L 67/42* (2013.01); *G06F 2009/4557* (2013.01)

(58) Field of Classification Search
None
See application file for complete search history.

(56) References Cited

U.S. PATENT DOCUMENTS 8,423,646 B2   4/2013   Jamjoom et al.
8,874,749 B1   10/2014  Vittal et al.
(Continued)

OTHER PUBLICATIONS

Cao et al., "Optimized Migration of Virtual Objects Across Environments in a Cloud Computing Environment" U.S. Appl. No. 14/584,760, filed Dec. 29, 2014.
(Continued)

*Primary Examiner* — Wissam Rashid
(74) *Attorney, Agent, or Firm* — Martin & Associates, LLC; Bret J. Petersen

(57) ABSTRACT

An appliance migration mechanism (AMM) optimizes migration of a live virtual appliance with virtual objects between cloud environments to minimize temporary connections that use significant cloud resources during the migration. The AMM determines a cost of connections of each virtual object in the virtual appliance and produces an order of migration for the virtual objects. The cost of connections of the virtual objects may be determined by the total number of connections and the maximum number of connections. Alternatively the cost of the connections of the virtual objects for migration could be determined by a weighting the costs of the connections where the weighting may consider loading or other factors on the connection.

11 Claims, 11 Drawing Sheets

(51) Int. Cl.
  *H04L 12/24* (2006.01)
  *H04L 29/08* (2006.01)
  *H04L 29/06* (2006.01)
  *G06F 9/50* (2006.01)

(56) References Cited

U.S. PATENT DOCUMENTS

| | | | |
|---|---|---|---|
| 2012/0011254 A1* | 1/2012 | Jamjoom | G06F 9/4856 709/226 |
| 2013/0054813 A1* | 2/2013 | Bercovici | G06F 9/4856 709/226 |
| 2014/0040343 A1 | 2/2014 | Nickolov et al. | |

OTHER PUBLICATIONS

Cao et al., "Optimized Migration of Virtual Objects Across Environments in a Cloud Computing Environment" U.S. Appl. No. 14/585,482, filed Dec. 30, 2014.

Cao et al., "Optimized Migration of Virtual Objects Across Environments in a Cloud Computing Environment" U.S. Appl. No. 15/815,655, filed Nov. 16, 2017.

IBM, List of IBM Patents or Patent Applications Treated as Related, dated Jan. 31, 2018.

IBM, List of IBM Patents or Patent Applications Treated as Related, dated Mar. 6, 2018.

* cited by examiner

```
main () {
Initialize UnMigratedVMs with a list of all virtual objects of the virtual appliance which are to be migrated
For each Virtual Object: V in UnMigratedVMs { /
  max_Connections = 0;
  Total_Connections = 0
  FindNextConnections(V, MigratedVMs, UnMigratedVMs)
  if Total_Connections and / or max_Connections is cheapest so far then save Ordered List of MigratedVMs
  }
} //end main
//================================================================
  FindNextConnections(V, MigratedVMs, UnMigratedVMs) {
      If V in MigratedVMs {
        return   // end recursion
       }
      Num_Connections=0;
      remove V from UnMigratedVMs
      append V to MigratedVMs   // maintains order
      Num_Connections++;  //migrate counts as connection
      For each Connection C of V {
        If C in UnMigratedVMs
           Num_Connections++; //connection to unMigrated crosses env
        }
     Total_Connections += Num_Connections
      if (Num_Connections>max_Num_Connections) {
        max_Num_Connections = Num_Connections;
       }
       //optional Add early out here if we have at least one complete MigratedVM list, if we have a new max or
a new high ot total_connections For each Connection C of V {
        If C in UnMigratedVMs {
            FindNextConnections(C, MigratedVMs, UnMigratedVMs)   //recursive call
          } //if
       }//for
}//method
```

FIG. 7

OPTIMIZED MIGRATION OF VIRTUAL OBJECTS ACROSS ENVIRONMENTS IN A CLOUD COMPUTING ENVIRONMENT

BACKGROUND

1. Technical Field

This invention generally relates to cloud computing systems, and more specifically relates to optimized migration of virtual objects to minimize temporary connections between cloud environments to reduce the cost of resources for the migration.

2. Background Art

Cloud computing is a common expression for distributed computing over a network and can also be used with reference to network-based services such as Infrastructure as a Service (IaaS). IaaS is a cloud based service that provides physical processing resources to run virtual machines (VMs) as a guest for different customers. The virtual machine may host a user application or a server.

A virtual appliance is sometimes described as an application that can be delivered as a prebuilt unit to execute in a cloud computing environment. As used herein, a virtual appliance is set of two or more virtual objects that work together to provide a service or function to one or more clients in a cloud environment. The virtual objects may include virtual machines, virtual networks, virtual disks or other virtual appliances. A "live" virtual appliance refers to a virtual appliance that has clients connected to it. It is sometimes desirable to migrate a live virtual appliance from one environment to another. The environment may be a physical machine, a network, cloud or pool. The connected virtual objects that make up the virtual appliance usually cannot be moved all together in parallel, so the virtual objects are typically moved one at a time to the new environment. To keep the virtual appliance live, the system must maintain connections between the various virtual machines across the environments during the migration. Maintaining these connections between the environments may require significant resources.

BRIEF SUMMARY

An apparatus and method optimize migration of a live virtual appliance with virtual objects between cloud environments to minimize temporary connections that use significant cloud resources during the migration. An appliance migration mechanism (AMM) determines a cost of connections of each virtual object in the virtual appliance and produces an order of migration for the virtual objects. The cost of connections of the virtual objects may be determined by the total number of connections and the maximum number of connections. Alternatively the cost of the connections of the virtual objects for migration could be determined by weighting the costs of the connections where the weighting may consider loading or other factors on the connection.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 7 is an example of a recursive computer program for optimized migration of a virtual appliance as described herein;

DETAILED DESCRIPTION

Figure 1:
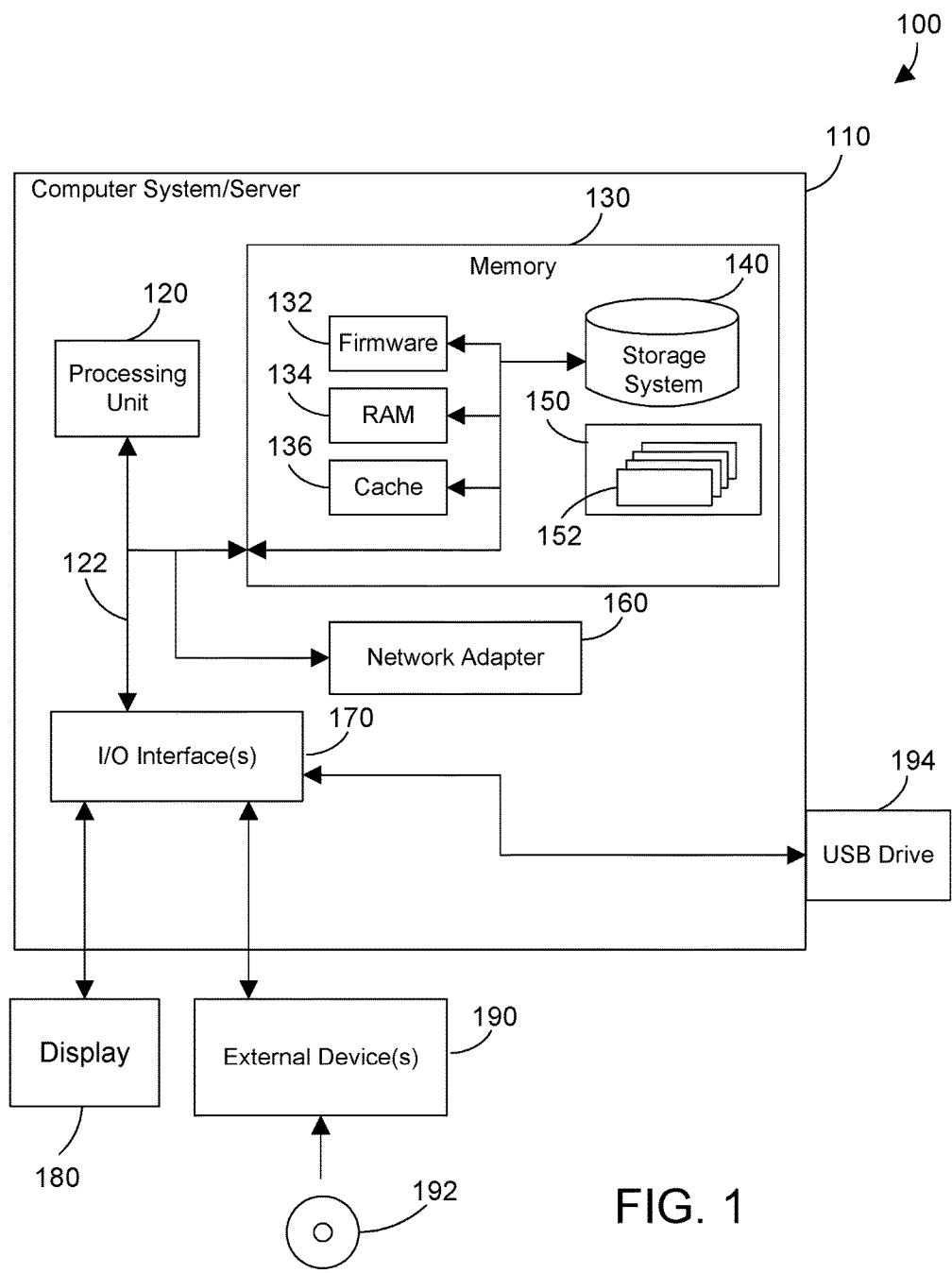
FIG. 1 is a block diagram of a cloud computing node.

The claims and disclosure herein describe an optimize migration of a virtual appliance with virtual objects between cloud environments to minimize temporary connections that use significant cloud resources during the migration. An appliance migration mechanism (AMM) determines a cost of connections of each virtual object in the virtual appliance and produces an order of migration for the virtual objects. The cost of connections of the virtual objects may be determined by the total number of connections and the maximum number of connections. Alternatively the cost of the connections of the virtual objects for migration could be determined by weighting the costs of the connections where the weighting may consider loading or other factors on the connection.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. Examples of removable media are shown in FIG. 1 to include a Digital Video Disc (DVD) 192 and a USB drive 194.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. One suitable example of an external device 190 is a DVD drive which can read a DVD 192 as shown in FIG. 1. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
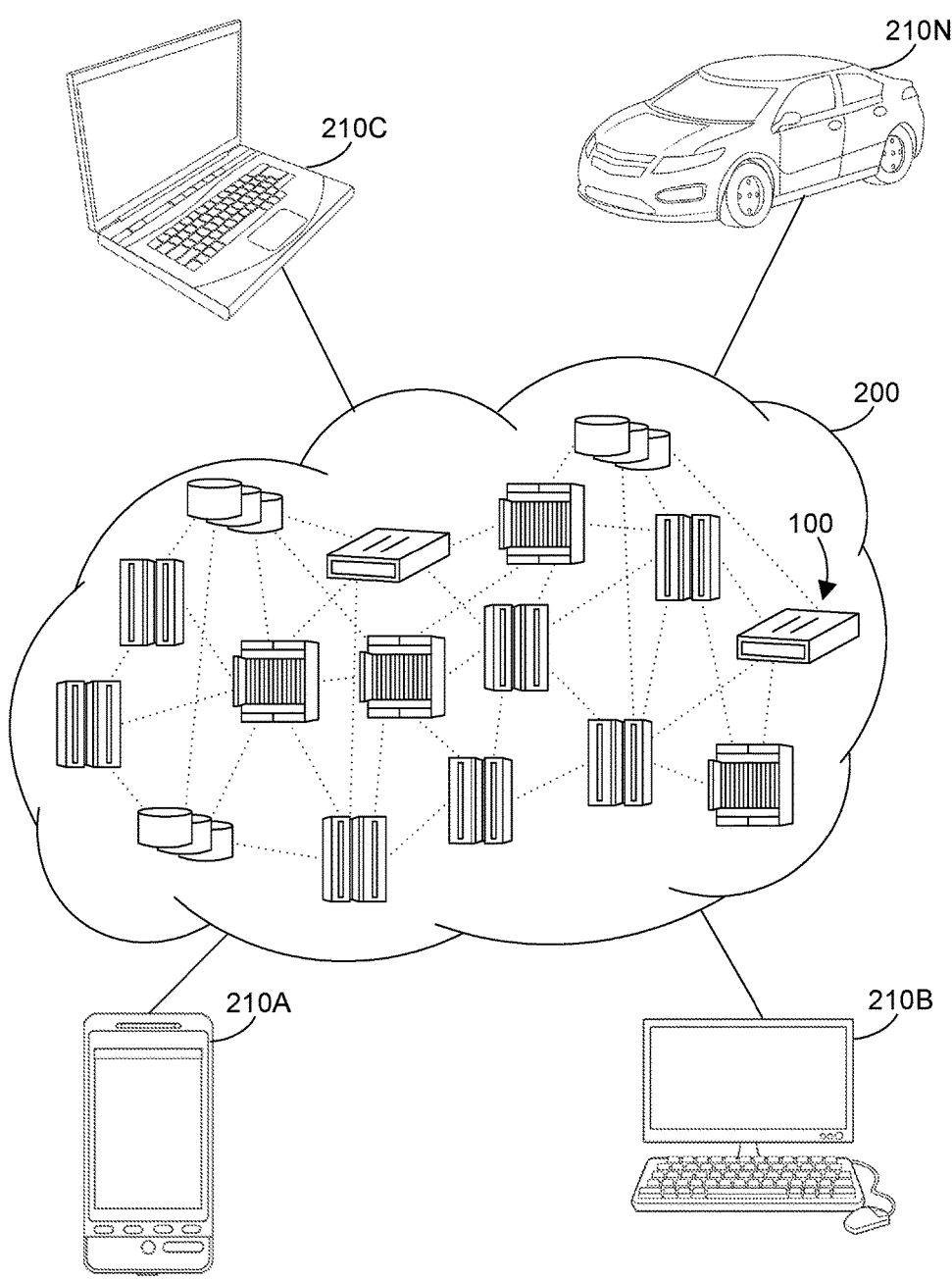
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
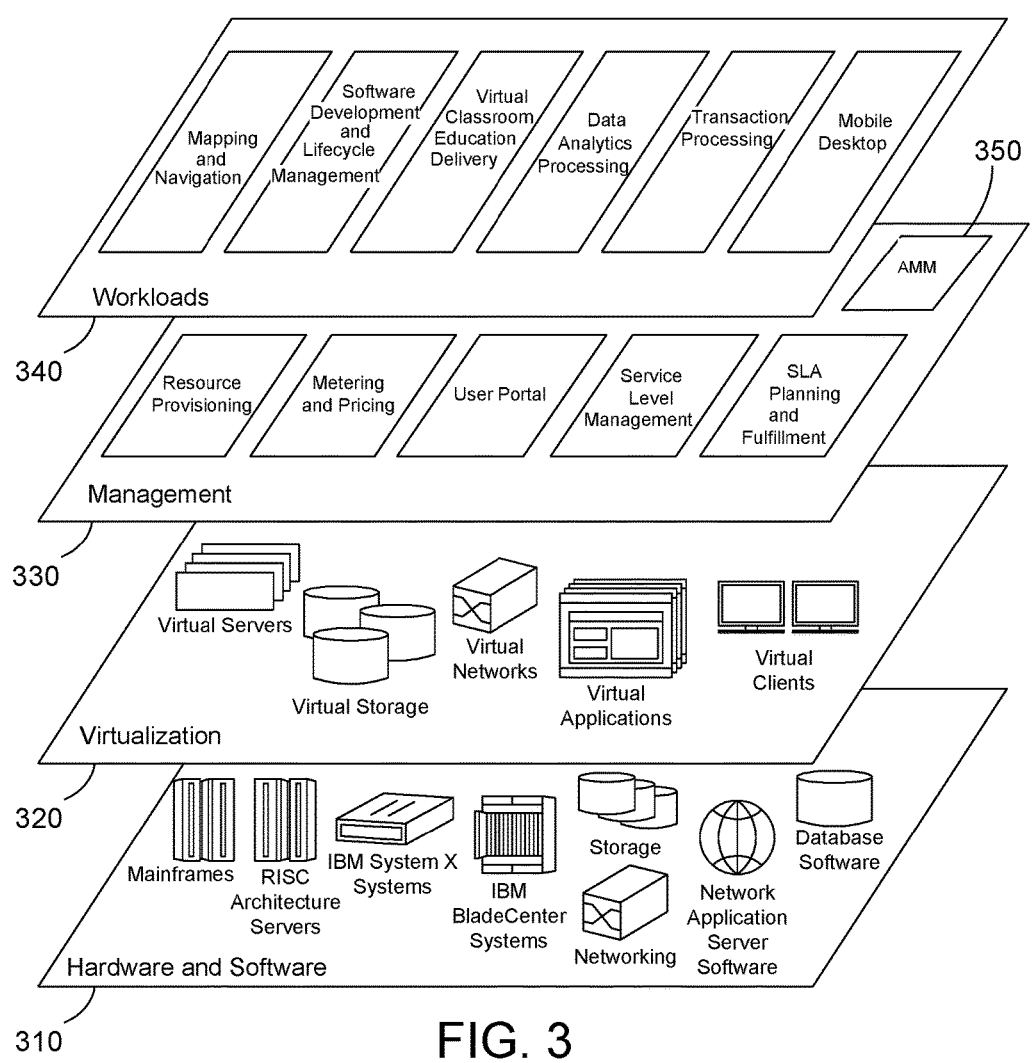
FIG. 3 is a block diagram of abstraction model layers.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. The management layer further includes an application migration mechanism (AMM) 350 as described herein. While the AMM 350 is shown in FIG. 3 to reside in the management layer 330, the AMM 350 actually may span other levels shown in FIG. 3 as needed.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As introduced above, when migrating a virtual appliance between cloud environments in the prior art, connected virtual objects of the appliance are typically moved one at a time to the new environment. To keep the virtual appliance live, the system maintains the connections between the various virtual machines across the environments during the migration. The disclosure and claims herein described a method and apparatus to optimize the migration of a virtual appliance between cloud environments to minimize the temporary connections and thus their associated connection costs to the system. The optimized migration of the virtual appliance as described herein is performed by the appliance migration mechanism (AMM) introduced with reference to FIG. 3.

Figure 4:
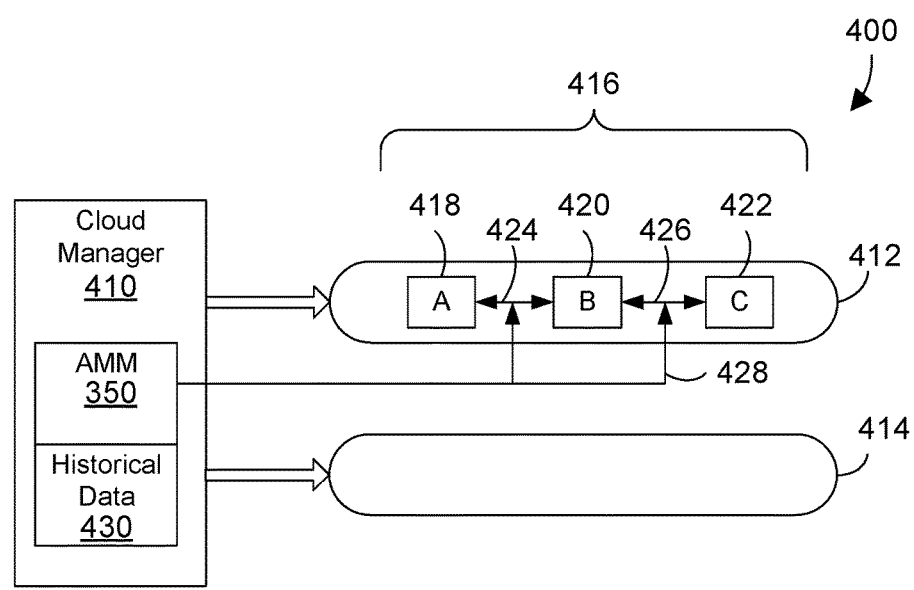
FIG. 4 is a block diagram that illustrates an example of a cloud system with optimized migration of a virtual appliance as described herein.

Referring now to FIG. 4, a block diagram illustrates a multiple cloud system 400 for optimized migration of a virtual appliance between cloud environments. The cloud system 400 includes a cloud manager 410 that manages one or more clouds. Except as described herein, the cloud manager may function in the same manner as cloud managers known in the prior art. In this example, the application migration mechanism (AMM) 350 is incorporated into the cloud manager 410. The AMM determines a cost of connections of each virtual object in the virtual appliance and produces an order of migration for the virtual objects that will reduce the connection costs during migration.

Referring again to FIG. 4, in this example the cloud manager 410 manages a first cloud 412 and a second cloud 414. The first cloud 412 includes a virtual appliance 416. The virtual appliance 416 comprises virtual object A 418, virtual object B 420 and virtual object C 422. Virtual object A has a connection 424 to virtual object B 420. Virtual object B 420 has a connection 426 to virtual object C 422. The connections 424, 426 may be identified in the definition of virtual appliance 416 for example as defined in various properties and initialization files. Alternatively, these connections may be identified by looking at the patterns of communication on the network and inferring connection relationships.

In the example shown in FIG. 4, the AMM will optimize the migration the virtual appliance 416 from the first cloud 412 to the second cloud 414. The AMM determines the resource costs of connections between the virtual object in the virtual appliance for the optimization. In this example, the AMM monitors 428 the connections 424, 426 between the virtual objects. The AMM may store the connection cost information determined by monitoring the connections in historical data 430. This allows the AMM to use connection cost data over various time periods in calculating costs of connections. To determine connection costs, the AMM may monitor the physical traffic on the network over network connections 424, 426 via any known network monitoring technology. For example, the AMM may count physical packets, and look at from/to data in the headers. Alternatively, the AMM may query virtual objects 418, 420, and 422 and inquire how much data they have placed on the connections 424, 426 in a specified time period (for example the last minute, or ten minutes, etc). Additionally, the AMM may query hardware supporting the connections (routers, switches, hubs, etc) to request a maximum transmission rate, or an average transmission rate over a specified time period.

Figure 5A:
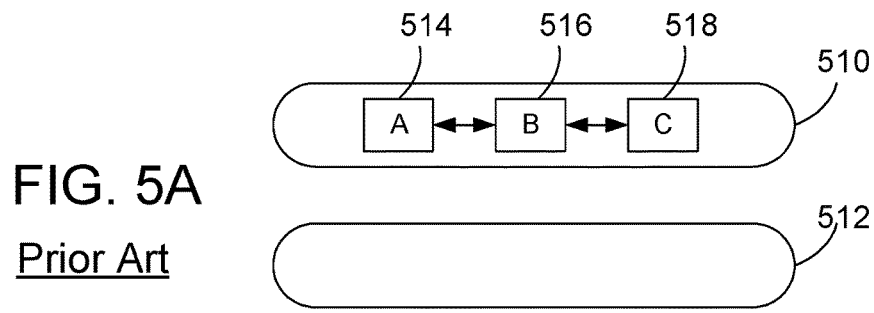
FIGS. 5A-5G illustrate an example of migration of a virtual appliance according to the prior art.
Figure 5B:
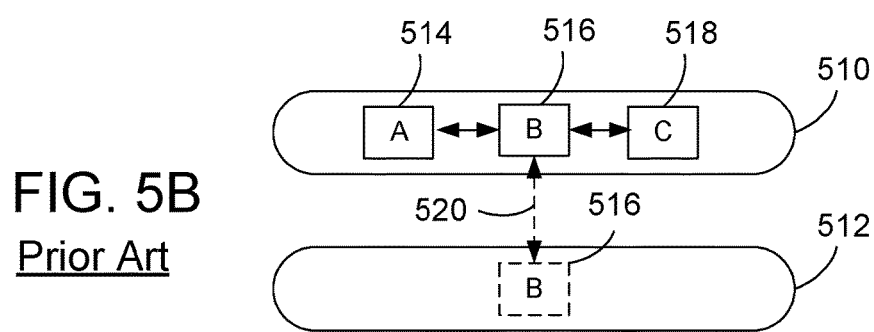

FIGS. 5A through 5G illustrate an example of migrating a virtual appliance according to the prior art. In this simplified example, a first cloud 510 includes a virtual appliance that comprises virtual object A 514, virtual object B 516 and virtual object C 518. It is understood that a virtual appliance may actually contain many more virtual objects with many more connections. FIGS. 5B through 5G show the steps to move the virtual appliance from the first cloud 510 to the second cloud 512. In this example, the system randomly selects to move virtual object B 516 first. FIG. 5B illustrates the migration of virtual object B 516 to the second virtual cloud 512. The migration of virtual object B 516 to the second virtual cloud is done over a connection 520 in the manner know in the prior art. This type of connection will be referred to as a migration connection. The migration connection 520 may require significant cloud and network resources if virtual object B is of substantial size.

Figure 5C:
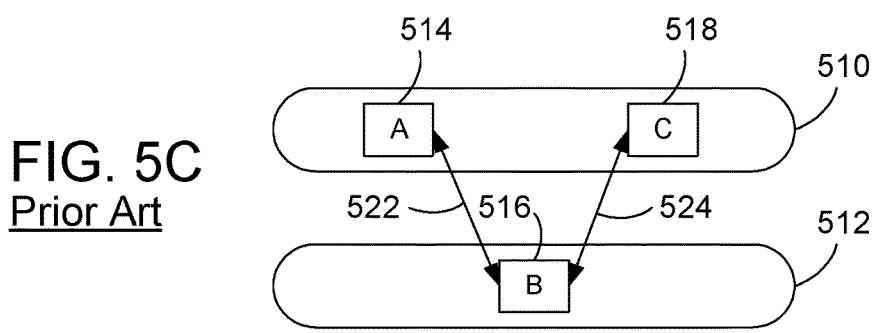
Figure 5D:
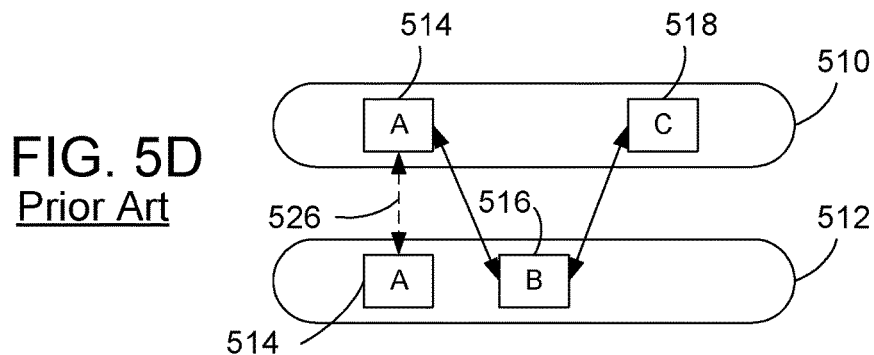
Figure 5E:
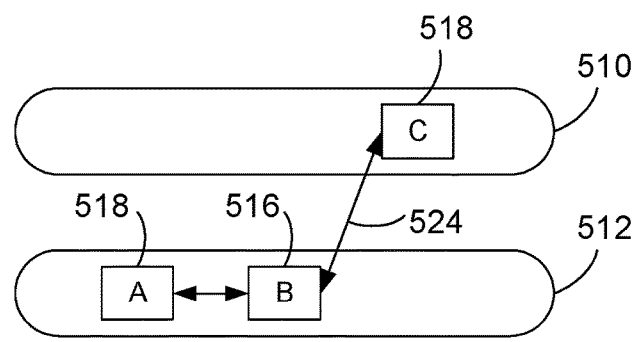
Figure 5F:
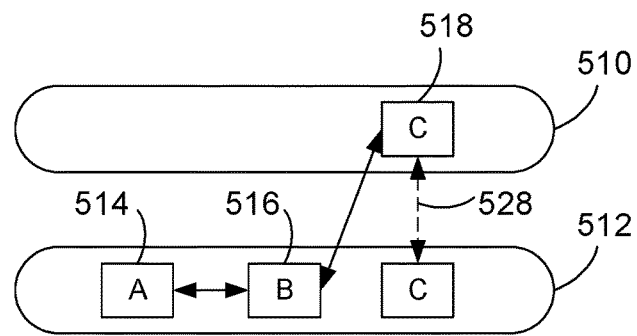
Figure 5G:
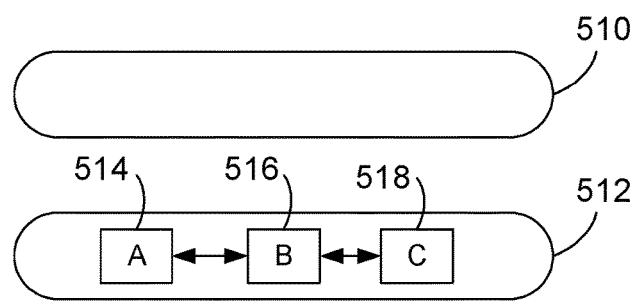

FIG. 5C illustrates the example after the migration of virtual object B 516 has been completed. At this point virtual object B 516 is executing in cloud 512. The cloud manager maintains the connections 522, 524 to virtual object B 516 in the manner known in the prior art so that the appliance can continue execution without interruption. The connections 522, 524 to virtual object B are communication connections. These connections may require very little or substantial network resources depending upon the application. Next the system determines to migrate virtual object A 514. The migration of virtual object A 514 to the second virtual cloud 512 is done over a migration connection 526 as shown in FIG. 5D. When the migration of virtual object A is complete the system will appear as shown in FIG. 5E. Next, FIG. 5F shows that the system finally proceeds to migrate virtual object C 518. The migration of virtual object C 518 to the second virtual cloud 512 is done over a migration connection 528. When the migration of virtual object C is complete the system will appear as shown in FIG. 5G, where all the virtual objects in cloud 510 have been migrated to cloud 512.

It is important to note the total cross environment connections in the example shown in FIGS. 5A through 5G. Cross-environment connections as used herein means connections between objects in the two different clouds. In this example, if we total the cross environment connections in each step, there are a total of nine connections made to migrate the virtual appliance from the first cloud 510 to the second cloud 512. Three of the connections are of the migration type (520, 526, 528) and six of the connections are of the communication type (522, 524 counted at each step). The communication type connections are recounted at each step for comparison purposes. While they are actually the same connection, recounting them gives a count that reflects the use of resources as these connections continue to be open and carrying data traffic during each step. Also of particular note is the maximum number of cross cloud/environment connections at any one time is three as shown in FIG. 5D.

Figure 6A:
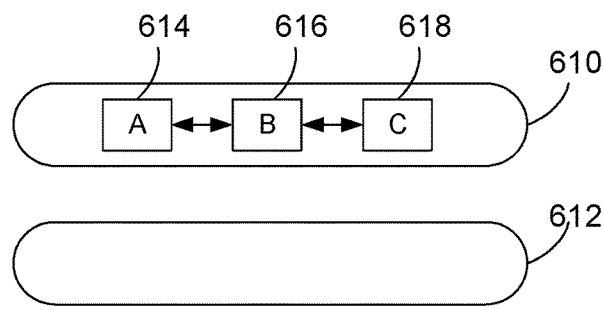
FIGS. 6A-6G illustrate an example of optimized migration of a virtual appliance as described herein.
Figure 6B:
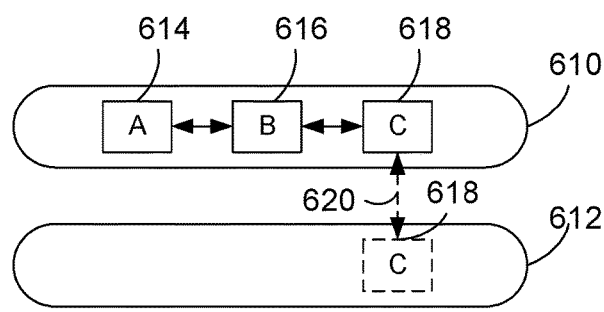
Figure 6C:
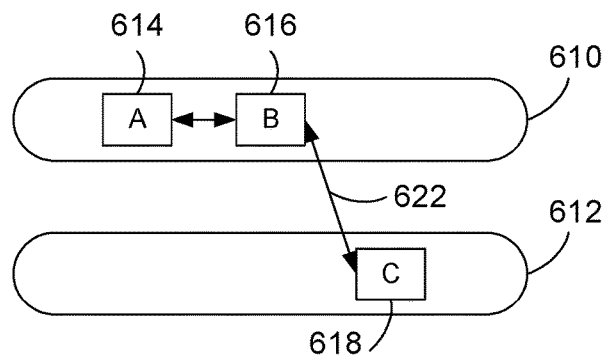
Figure 6D:
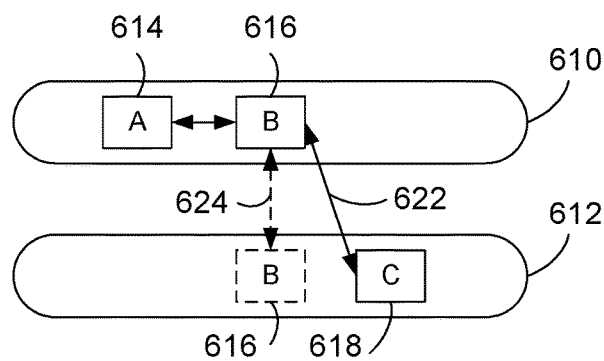
Figure 6E:
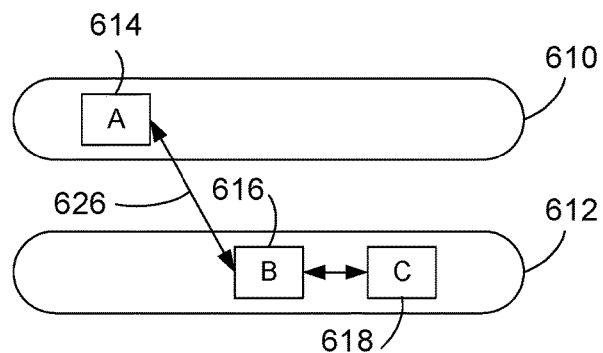
Figure 6F:
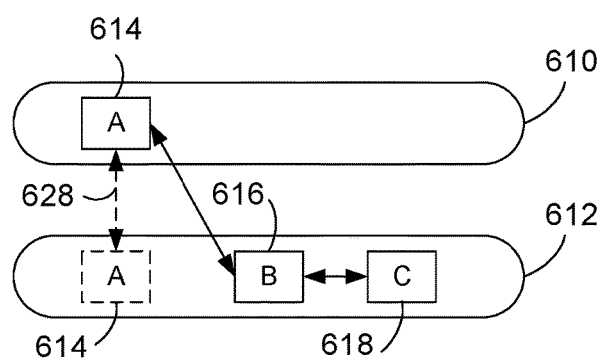
Figure 6G:
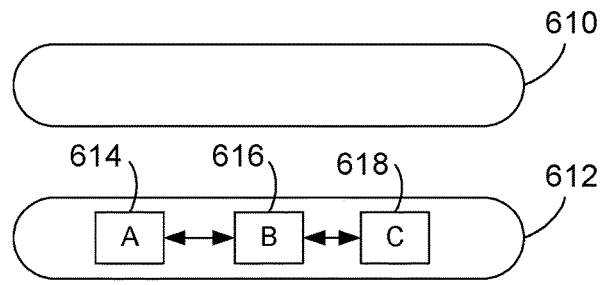

FIGS. 6A through 6G illustrate an example of optimized migration of a virtual appliance between cloud environments. Again this is a simplified example for illustration. A first cloud 610 includes a virtual appliance that comprises virtual object A 614, virtual object B 616 and virtual object C 618. FIGS. 6B through 6G show the steps executed by the AMM to optimize the migration of the virtual appliance from the first cloud 610 to the second cloud 612. The AMM optimizes the migration by determining to first move virtual object C 516. The manner of determining the order of migration is described further below. FIG. 6B illustrates the migration of virtual object C 618 to the second virtual cloud 612. The migration of virtual object C 618 to the second virtual cloud is done over a migration connection 620. FIG. 6C illustrates the example after the migration of virtual object C 618 has been completed. At this point virtual object C 618 is executing in cloud 512. The cloud manager maintains the single connection 622 to virtual object C 618 so that the appliance can continue execution without interruption. Next the AMM determines as described below to migrate virtual object B 616. The migration of virtual object B 616 to the second virtual cloud 612 is done over a migration connection 624 as shown in FIG. 6D. When the migration of virtual element B is complete the system will appear as shown in FIG. 6E. Next, FIG. 6F shows that the AMM finally proceeds to migrate virtual object A 614. The migration of virtual object A 614 to the second virtual cloud 512 is done over a migration connection 628. When the migration of virtual element A is complete the system will appear as shown in FIG. 6G.

Again referring to FIGS. 6A through 6G, the total cross environment connections in the optimized migration is less than the prior art example. In this example, there are a total 7 cross environment connections made to migrate the virtual appliance from the first cloud 610 to the second cloud 612. Again there are three migration type connections (620, 624, 628). However there are only 4 communication type connections counted at each step. Most advantageously, the maximum number of connections at any one time is two as shown in FIGS. 6D and 6F. By optimizing the order of migration the number of connections made and the maximum number of connections at any point in time is reduced from the prior art example.

The AMM optimizes migration of a virtual appliance with virtual objects between cloud environments to minimize cross environment connections. The appliance migration mechanism (AMM) seeks to determine an optimized order to migrate the virtual objects. For example, the AMM may determine or estimate a cost for connections for moving each virtual object in the virtual appliance. The AMM may then compare the costs and produce an order of migration for the virtual objects based on the lowest cost for the migration. The AMM then moves or directs other entities in the cloud manager 410 (FIG. 4) to move the virtual objects to the new cloud in the determined order. The cost of the cross environment connections may be determined in various ways. For example, the cost of cross environment connections during migration may be estimated by the total number of connections and the maximum number of connections as illustrated in the previous example in FIGS. 6A through 6G. The total number of connections and the maximum number of connections can be used singularly or in combination to determine the cost of connections.

FIG. 7 is an example of a recursive computer program 700 to optimize migration of a virtual appliance. Program 700 determines an optimized order to migrate the virtual objects by estimating the cost for moving each virtual object based on the number of connections or the maximum number of connections. The program initializes a list for the initial cloud (UnMigratedVMs) with all virtual objects of the virtual appliance that will be migrated. A list for the target cloud that is initially empty is also created. The program then calls a recursive routine to consider first moving each virtual object in the list. The program then selects an object and moves it to the target cloud list and determines how many connections are drawn to the target cloud by the move. An object connected to the first object is then moved until all the objects have been moved while adding the total connections and store the maximum number of connections for each object. The recursive routine adds the total number of connections and stores the maximum number of connections at any one time. The AMM uses the total number of connections and the maximum number of connections to determine the virtual object with the least cost in connections to move first. The recursive routine can determine the optimal order to migrate the virtual objects by only keeping the list with the lowest cost based on the number of connections.

In another example for optimized migration of a virtual appliance, the AMM determines the cost of the connections by weighting each of the connections between the virtual object. In the previous example the weighting costs of the connections were essentially assumed to be equal and just added together. In this example, the computer program in FIG. 7 would aggregate a weighting cost by adding a connection weighting factor for each connection found. The weighting factor could be calculated as a percentage of an interface bandwidth that the cross environment connection will require. The AMM would then choose the virtual object with connections with the lowest total weighting factor that represents the lowest percentage of the connection bandwidth between the virtual objects. The weighting of the connections could consider current and/or historical loading or other factors of the cross environment connection. The historical connection cost or loading of the connections is stored by the AMM in the historical data 430 (FIG. 4).

In another example for optimized migration of a virtual appliance, the AMM could optionally move multiple virtual objects. In the above examples, the AMM only moved a single virtual object. If the system has the capability and if the virtual objects are small enough, the VMM could choose a group or subset of the virtual objects to move together and then determine the costs of connections between the chosen group and the virtual objects remaining at the original environment.

Figure 8:
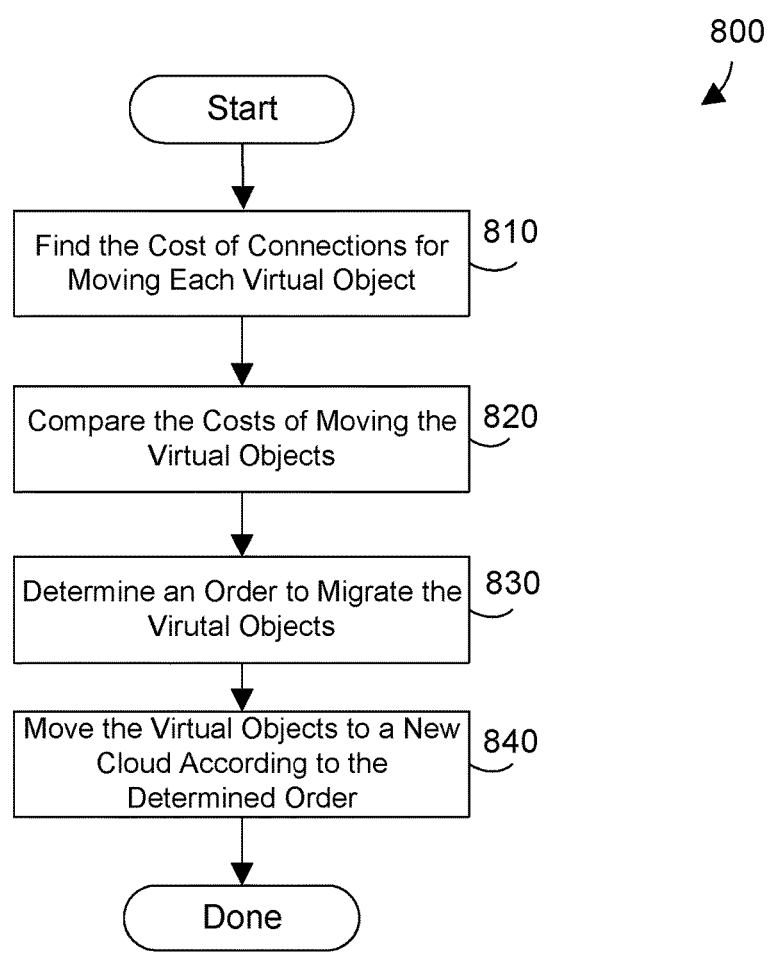
FIG. 8 is a flow diagram of a method for optimized migration of a virtual appliance.

FIG. 8 illustrates a flow diagram of a method 800 for optimized migration of a virtual appliance with virtual objects between cloud environments. The method 800 is presented as a series of steps performed by a computer software program such as the appliance migration mechanism 350 described above. First, find the cost of connections for moving each of the virtual objects in an appliance (step 810). Compare the costs of moving the virtual objects (step 820). Determine an order to migrate the virtual objects based on the compared costs (step 830). Move the virtual objects to a new cloud according to the determined order (step 840). The method is then done.

Figure 9:
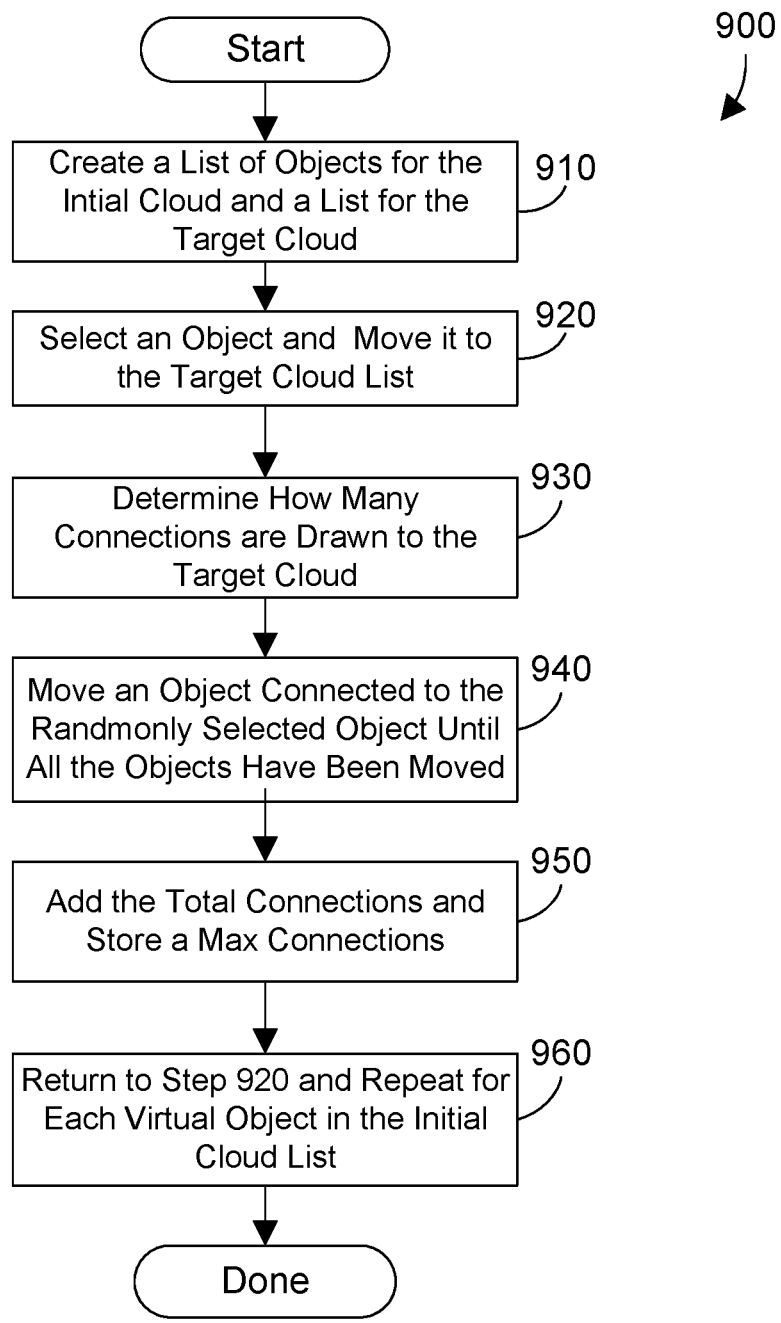
FIG. 9 is a flow diagram of an example method for step 810 in FIG. 8.

Referring now to FIG. 9, a flow diagram shows method 900 that is an exemplary method for performing step 810 in method 800. The method 900 is presented as a series of steps performed by a computer software program described above as the application migration mechanism 350. First, create a list of objects for the initial cloud and a list for the target cloud (the target cloud list is initially empty) (step 910). Randomly select an object and move it to the target cloud list (step 920). Determine how many connections are drawn to the target cloud by the move (step 930). Move an object connected to the randomly selected object until all the objects have been moved (step 940). Add the total connections and store the maximum number of connections for the selected object (step 950). Return to step 920 and repeat for each virtual object remaining in the initial cloud list (step 960). The method is then done.

The claims and disclosure herein provide an apparatus and method for optimized migration of a live virtual appliance with virtual objects between cloud environments. The appliance migration mechanism determines a cost of connections of each virtual object in the virtual appliance and produces an order of migration for the virtual objects to minimize temporary connections that use significant cloud resources during the migration.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for optimizing migration of a live virtual appliance having a plurality of virtual objects from a first virtual environment to a second virtual environment, the method comprises:
    determining a cost of cross-environment connections for moving each virtual object;
    comparing the cost of the cross-environment connections for moving each of the virtual objects;
    determining from the cost of the cross-environment connections for each of the virtual objects a migration order for the plurality of virtual objects of the live virtual appliance that minimizes cross-environment connections between the virtual objects during migration of the live virtual appliance from the first virtual environment to the second virtual environment to optimize the migration; and
    moving the plurality of virtual objects of the live virtual appliance to the second virtual environment in the order of the determined migration order.

2. The method of claim 1 further comprising monitoring connections among the plurality of virtual objects to determine a connection cost.

3. The method of claim 2 further comprising storing a historical connection cost for the monitored connections among the plurality of virtual objects.

4. The method of claim 1 further comprising:
    creating a list of objects for an initial cloud and a list for a target cloud;
    repeatedly selecting a first object from the initial cloud and moving it to the target cloud and performing the following steps until each virtual object in the initial cloud is moved to the target cloud:
        determining how many connections are drawn to the target cloud;
        moving an object connected to the first object and add the connections required to a total connections and store a maximum connections; and
        repeatedly moving objects connected to the selected first object until all objects of the virtual appliance have been moved to the target cloud.

5. The method of claim 1 wherein determining the cost of connections of the virtual objects comprises aggregating a weighting factor for each connection for the plurality of virtual objects.

6. The method of claim 5 further comprising determining the weighting factor for each connection by a percentage of the network bandwidth used by the connection.

7. The method of claim 1 wherein the cost of connections is determined for a plurality of subsets of the plurality of virtual objects in the virtual appliance from the total number of connections and a maximum number of connections for each of the subsets.

8. The method of claim 1 wherein the first virtual environment and the second virtual environment comprise a virtual cloud.

9. A computer-implemented method executed by at least one processor for optimizing migration of a live virtual appliance having a plurality of virtual objects from a first virtual cloud to a second virtual cloud, the method comprises:
    determining a cost of cross-environment connections for moving each virtual object;
    comparing the cost of the cross-environment connections for moving each of the virtual objects;
    determining from the cost of the cross-environment connections for each of the virtual objects a migration order for the plurality of virtual objects of the live virtual appliance comprising:
        creating a list of objects for an initial cloud and a list for a target cloud;
        repeatedly selecting a first object from the initial cloud and moving it to the target cloud and performing the following steps until each virtual object in the initial cloud is moved to the target cloud;
        determining how many connections are drawn to the target cloud;
        moving an object connected to the first object and add the connections required to a total connections and store a maximum connections; and
        repeatedly moving objects connected to the selected first object until all objects of the virtual appliance have been moved to the target cloud;
    moving the plurality of virtual objects of the live virtual appliance to the second virtual cloud in the order of the determined migration order; and
    monitoring connections between the plurality of virtual objects to determine a connection cost and storing a historical connection cost for the monitored connections between the plurality of virtual objects.

10. The method of claim 9 wherein determining the cost of connections of the virtual objects comprises aggregating a weighting factor for each connection for the plurality of virtual objects determined by the percentage of the network bandwidth used by the connection.

11. The method of claim 9 wherein the cost of connections is determined for a plurality of subsets of the plurality of virtual objects in the virtual appliance from the total number of connections and a maximum number of connections for each of the subsets.

* * * * *